(12) United States Patent
Taima et al.

(10) Patent No.: US 8,913,269 B2
(45) Date of Patent: Dec. 16, 2014

(54) METHOD FOR PRINTING PDF FILES CONTAINING CORRUPTED PAGES

(71) Applicants: Katsuyuki Taima, Irvine, CA (US); John Phuong Tran, Garden Grove, CA (US)

(72) Inventors: Katsuyuki Taima, Irvine, CA (US); John Phuong Tran, Garden Grove, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/631,665

(22) Filed: Sep. 28, 2012

(65) Prior Publication Data

US 2014/0092410 A1 Apr. 3, 2014

(51) Int. Cl.
*G06F 3/12* (2006.01)
*G06F 15/00* (2006.01)
*G06K 1/00* (2006.01)
*G06K 15/00* (2006.01)

(52) U.S. Cl.
CPC .............. *G06F 3/121* (2013.01); *G06F 3/1234* (2013.01); *G06F 3/1285* (2013.01); *G06F 3/1244* (2013.01)
USPC ....... 358/1.14; 358/1.13; 358/1.15; 358/1.16; 358/1.17; 358/1.18; 358/1.9

(58) Field of Classification Search
CPC ... G06K 15/02; G06K 15/00; G06K 15/1857; G06K 15/1813; G06K 15/1856; G06F 3/1285; G06F 3/1208; G06F 3/1247; G06F 3/1284; G06F 3/1206; G06F 3/1244; G06F 3/1248; G06F 3/1211; G06F 3/125; G06F 3/1241; G06F 3/1245; G06F 3/1203; G06F 3/1205; G06F 3/1207; G06F 3/1259; G06F 3/1263; G06F 3/1267; G06F 3/127; G06F 3/1271; H04N 1/00

USPC ................ 358/1.12, 501, 1.1, 1.13–1.18, 1.9; 400/74

See application file for complete search history.

(56) References Cited

U.S. PATENT DOCUMENTS

| | | | |
|---|---|---|---|
| 7,352,481 B2* | 4/2008 | Christiansen | 358/1.13 |
| 7,656,548 B2* | 2/2010 | Hagiwara | 358/1.15 |
| 8,218,172 B2* | 7/2012 | Kato | 358/1.15 |
| 8,654,380 B2* | 2/2014 | Masuyama | 358/1.15 |
| 8,780,373 B2* | 7/2014 | Rivadeneira et al. | 358/1.14 |
| 2005/0168767 A1* | 8/2005 | Moroney et al. | 358/1.14 |
| 2008/0174811 A1 | 7/2008 | Tanaka et al. | |
| 2011/0051158 A1* | 3/2011 | Yamahata et al. | 358/1.9 |
| 2011/0255120 A1* | 10/2011 | Hirahara | 358/1.14 |
| 2012/0229852 A1* | 9/2012 | Kubo et al. | 358/1.15 |

* cited by examiner

*Primary Examiner* — Fred Guillermety
*Assistant Examiner* — Jonathan Beckley
(74) *Attorney, Agent, or Firm* — Chen Yoshimura LLP

(57) ABSTRACT

A method for print portable document format (PDF) files with corrupted pages, comprising the steps of rasterizing images of non-corrupt pages but not corrupted pages of a PDF file, printing only non-corrupt pages of the PDF file, gathering and recording file and page information including which pages are non-corrupt pages and which pages are corrupted pages in the PDF file, allowing correction of the corrupted pages of the PDF file for reprint, retrieving saved file and page information for reprint of the PDF file. Based on the file and page information retrieved and print options and merge mode selected, the reprint process proceeds with rasterizing images of the corrected corrupted pages, and printing the corrected corrupted pages while merging with the already-printed non-corrupt pages to produce a complete set of print out of all non-corrupt pages and corrected corrupted pages of the PDF file in a correct sequence according to the file and page information retrieved.

20 Claims, 15 Drawing Sheets

METHOD FOR PRINTING PDF FILES CONTAINING CORRUPTED PAGES

BACKGROUND OF THE INVENTION

1. Field of the Invention

This invention relates to apparatus and method for printing portable document format (PDF) files, and in particular, it relates to printing portable document format (PDF) files that contain corrupted pages.

2. Description of Related Art

PDF file format is widely used in document processing applications and printing processes. A PDF file contains complete description of a fixed-layout flat document that includes text, fonts, graphics and other information needed for displaying and printing the document. A PDF file often contains multiple pages each can be individually displayed or printed. However, oftentimes some of the pages in a PDF file are corrupted so that they cannot be displayed or printed correctly.

When a PDF file containing corrupted pages is printed, most current Printer Description Language (PDL) applications and printer drivers/interpreters will process the print job as a whole document, and will stop the process when an error such as a corrupted page is encountered. In addition, even when a page range is specified in an application print dialog, the application usually still process the job as a whole document before extracting the specified pages for printing. As result, the application still terminate the process if an error is encountered and not to print the document. Moreover, with a direct print method that does not go through a print application or printer driver, the PDL still behaves similarly by terminating the rendering process, and will generates an error message, due to the failure of rendering the whole document.

However, in a corrupted PDF file, many times there are still some pages within the document that are correctly formatted and may contain important info for users who wish to print them. That is, for certain users it is important to able to print the non-corrupt data because it might contain important information to the users and it also provides useful information about the corruption of the file, such as at what page(s) the corrupted data has occurred. Therefore it is desirable to print out the non-corrupted pages of a document contained in a PDF file even when some other pages of the document are corrupted.

In addition, it is also desirable to provide the users an opportunity to view the error information when page corruption is encountered, so that the users may correct the problem or cure the corruption, so that these pages may be printed correctly. Nonetheless, when the corrected PDF file is resent to be printed, it is desirable to print the corrected pages only without reprint the already-printed non-corrupt pages to avoid the waste of paper and other resources.

It is desirable to provide a new method for printing PDF files that contain corrupted pages to address the problems discussed above with regard to the behaviors and drawbacks of current PDF processing/printing applications and printer driver/interpreters.

SUMMARY

The present invention is directed to a method for printing PDF files that contain corrupted pages.

An object of the present invention is to provide a method for printing PDF files that contain corrupted pages without terminating the whole process when encountering corrupted pages, but rather continuing with printing of the non-corrupt pages and sending the corrupted pages back for correction, and then printing the corrected page only and merge them with the previously printed non-corrupt pages.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, one exemplary embodiment of the present invention provides a method for print portable document format (PDF) files with corrupted pages, comprising: rasterizing images of non-corrupt pages but not corrupted pages of a PDF file; printing only non-corrupt pages of the PDF file; gathering and recording file and page information including which pages are non-corrupt pages and which pages are corrupted pages in the PDF file; allowing correction of the corrupted pages of the PDF file for reprint; retrieving saved file and page information for reprint of the PDF file; based on the file and page information retrieved, rasterizing images of the corrected corrupted pages; and printing the corrected corrupted pages while merging with the already-printed non-corrupt pages to produce a complete set of print out of all non-corrupt pages and corrected corrupted pages of the PDF file in a correct sequence according to the file and page information retrieved.

In another aspect, a further exemplary embodiment of the present invention further provides a computer program product that causes a data processing apparatus to perform the above methods. The computer program product includes a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for printing PDF files that contain corrupted pages.

Figure 1:
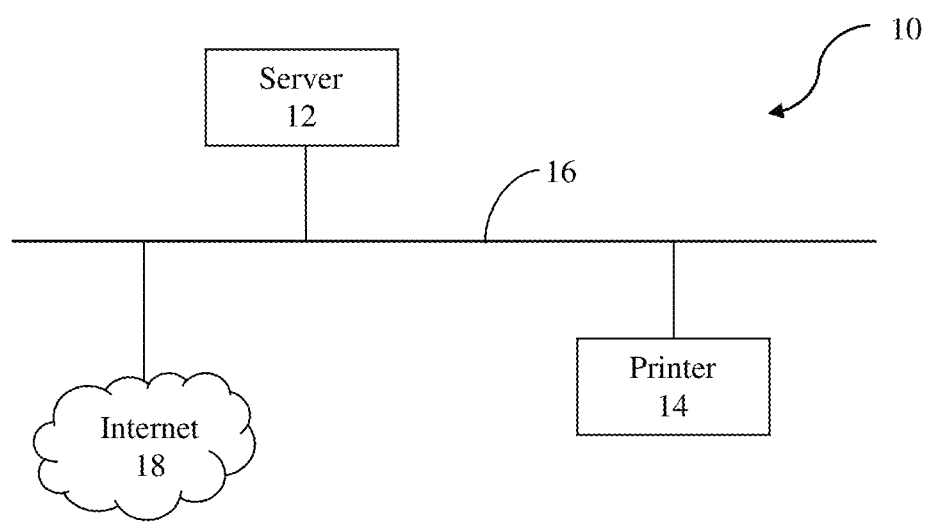
FIG. 1 schematically illustrates an exemplary arrangement of a printing system that implements the method for printing PDF files that contain corrupted pages according to embodiments of the present invention.

Referring to FIG. 1, there is schematically illustrated an exemplary arrangement of a printing system 10 that implements the method for printing PDF files that contain corrupted pages according to embodiments of the present invention. As shown in FIG. 1, the printing system 10 include a server 12 and a printer 14 directly or remotely connected to each other via a data communication channel or network 16 which may be a wired or wireless network, a dedicated cable or a serial bus connected to the printers, and which may also be connected to an open external computer network such as the Internet 18.

The term "server" used herein may be a network server, a desktop or laptop computer, a tablet computer, or any suitable data processing apparatus. The term "printer" used herein may be small desk-top printers typically seen in an office environment, or large printing systems used in print/copy departments at large organizations or professional print shops. It may also cover other similar image and document processing devices such as copiers or multifunction ("all-in-one") printers that also have copier, scanner and/or facsimile functions. As described above, the printer may be directly attached to a computer or server, or connected to a computer or server through a network, where the computer or server are used to generate and send a print job to be processed by the printer, typically through a printer driver which is a computer software program normally installed on the computer or server for converting the document or image to be printed to the form specific to the printer. The printer may have multiple paper trays to store paper of various sizes, color, and types. Further, the printer may be equipped with a sophisticated output sorting and inserting mechanism with multiple output trays to perform collate printing or other print finishing functions.

Figure 2:
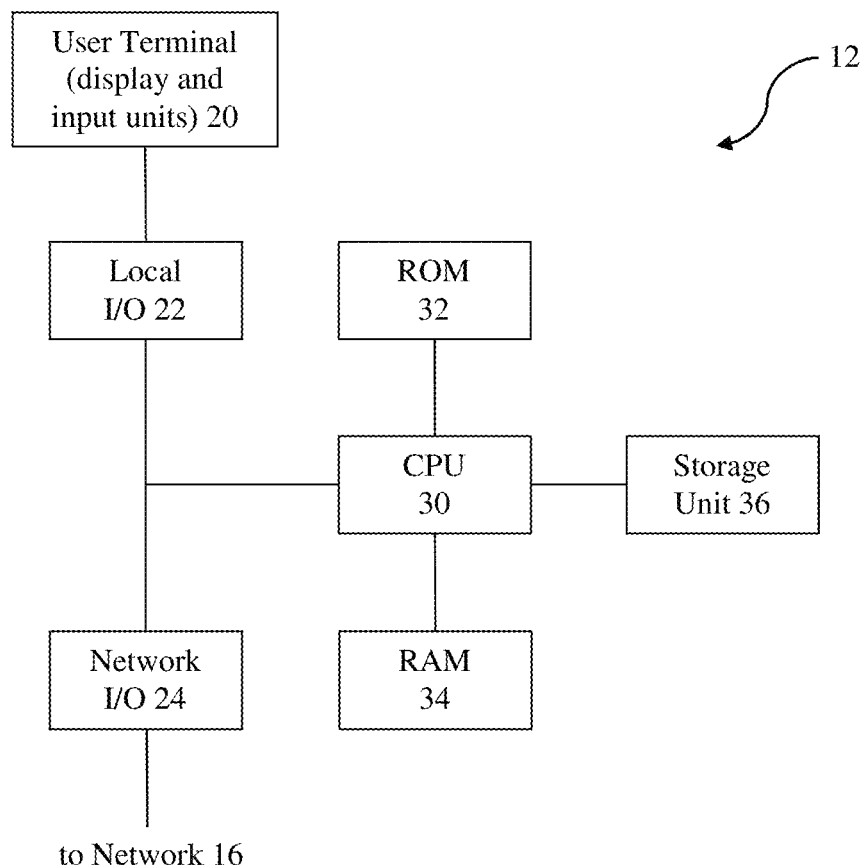
FIG. 2 schematically illustrates an exemplary arrangement of a server in the printing system that implements the method for printing PDF files that contain corrupted pages according to embodiments of the present invention.

Referring to FIG. 2, there is schematically illustrated an exemplary configuration of the server 12 in the printing system 10 that implements the method for printing PDF files that contain corrupted pages according to embodiments of the present invention. As shown in FIG. 2, the server 12 typically has a user terminal with display and input units 20 connected to the server 12 to enable a user to interact with the server 12 and the printing system 10. Alternatively the server 12 may have its own integrated display and input units to enable a user to interact with the printing system 10. The server 12 typically includes a local input/output (I/O) port 22 for connection with the user terminal 20, and a network I/O port 24 for connection with the data communication channel or network 16.

The server 12 also has a central processor unit (CPU) 30 that controls the function and operation of the server 12 and execute computer instructions and programs installed or saved on the random access memory (RAM) 32, read only memory (ROM) 34 and/or storage unit 36 such as a hard disc drive, all coupled to the CPU 30.

Figure 3:
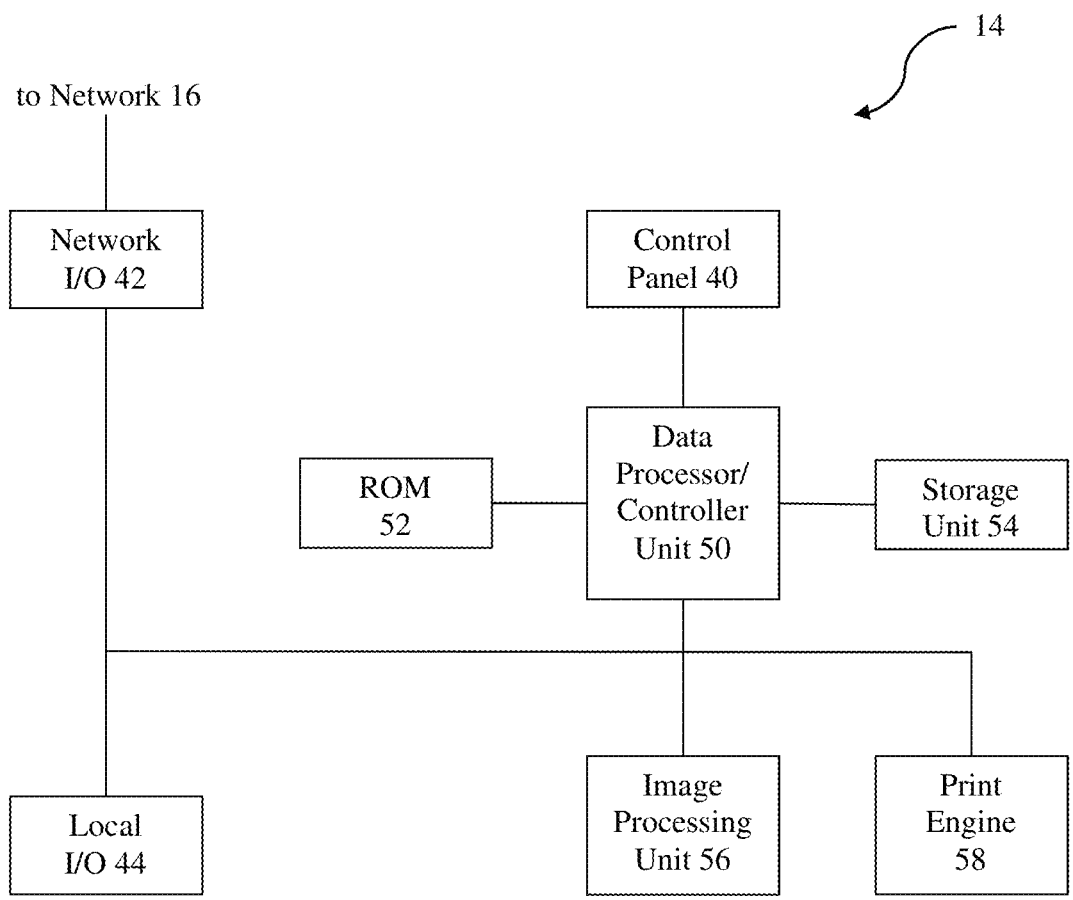
FIG. 3 schematically illustrates an exemplary arrangement of a printer in the printing system that implements the method for printing PDF files that contain corrupted pages according to embodiments of the present invention.

Referring to FIG. 3, there is schematically illustrated an exemplary configuration of the printer 14 in the printing system 10 that implements the method for printing PDF files that contain corrupted pages according to embodiments of the present invention. As shown in FIG. 3, printer 14 has a control panel 40 which is accessible by a user to provide a user interface (UI) that may include a display screen such as a liquid crystal display (LCD) display screen and user input devices such as keys, buttons, touch screen, etc., for a user to communicate with the printer 14 and control the functions and operations of printer 14. The printer 14 also includes a network I/O port 42 for connection with the network 16 and local I/O port 44 for optionally connecting with, for example, a local computer.

The printer 14 has a data processor or controller unit 50 that controls the function and operation of the printer 14. The controller unit 50 is connected to a ROM 52 and a data storage unit 54. The software program exemplarily implementing the present invention method and process may be installed on the server 12, but may also be installed on ROM 52 or data storage unit 54 of the printer 14, which is a type of non-transitory memory medium, and can be accessed and executed by the controller unit 50 of the printer 14. The printer 14 further includes an image processing unit 56 and a print engine 58 that are coupled to and controlled by the controller unit 50 of the printer 14.

One of the main purposes of the present invention is to be able to print corrupted PDF file with the printer completely stops to print anything or merely prints an error page, as most conventional printers do. Conventionally, most PDL interpreters, e.g., Adobe Configurable PostScript Interpreter (CPSI), Adobe PDF Print Engine (APPE), etc., would either generate an error page or flush the job when an error happened during rendering process. However, for certain users the desire to be able to print out at least the non-corrupt data is important to them, because it might contain important info for whatever purpose it may be. It also provides useful information, e.g., at what pages the corrupt data occurred.

According to one exemplary embodiment of the present invention, the printing process can be controlled to provide different options. For examples, one option is to avoid terminating the print job or generate error page by skipping the rendering of the corrupt pages. Another option is to render each corrupt page as an error or blank page. A further option is to render all corrupt pages as one error page. These options can achieve the user's desire to obtain the important non-corrupt data. When sending a PDF file is to print which contains corrupted pages, the interpreter of the printer will start rendering the data and apply the selected option (which may be controlled by, e.g., engine DIP switch setting) when encounter a corrupt data during rendering. The DIP switch setting may be set from the printer control panel, which will update the interpreter database on how to handle corrupt pages during data rendering.

Figure 4:
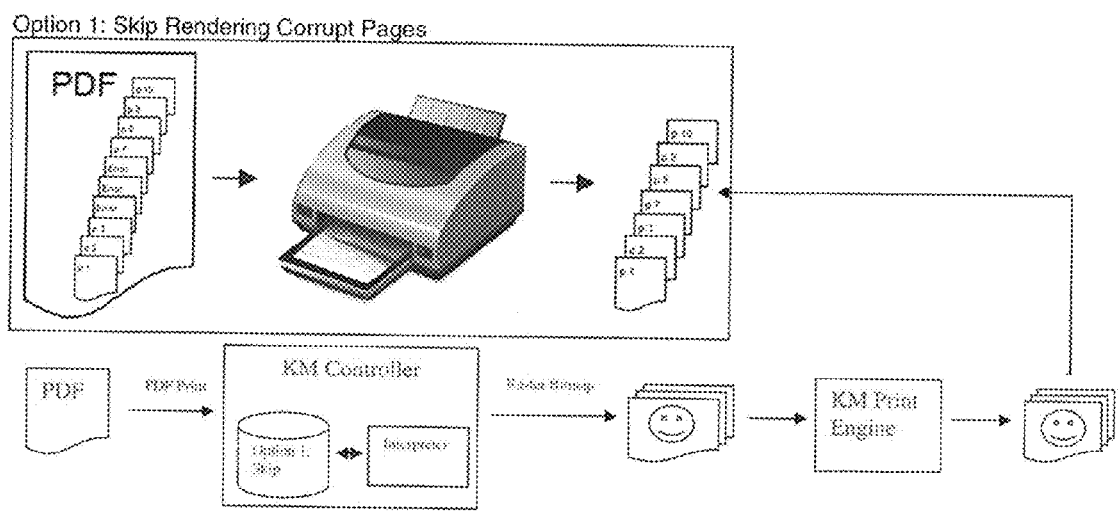
FIG. 4 schematically illustrates an exemplary optional process for printing PDF files that contain corrupted pages according to embodiments of the present invention.

Referring to FIG. 4, there is schematically illustrated an exemplary optional process for printing PDF files that contain corrupted pages according to embodiments of the present invention. As shown in FIG. 4, for this first option (Option 1) where the DIP switch setting is to skip rendering corrupt pages, the rendering process will render the non-corrupt pages normally, but skip each corrupt page, and continue rendering the next page until reaching the end of the PDF file. For PDF data, the next page is usually indicated by page number as included in PDF file content. For PS data, the next page is usually indicated by the keyword "showpage" in the PDF file content. As a result, only non-corrupt pages will be fully rendered and produced as the final printed output. The interpreter detects the corrupt page when it encounters an error during the rendering process. In the example shown in FIG. 4, the PDF file contains 10 pages, where pages 4-6 are corrupted. This optional process will skip pages 4-6 and only the non-corrupt pages 1-3 and 7-10 are printed.

Figure 5:
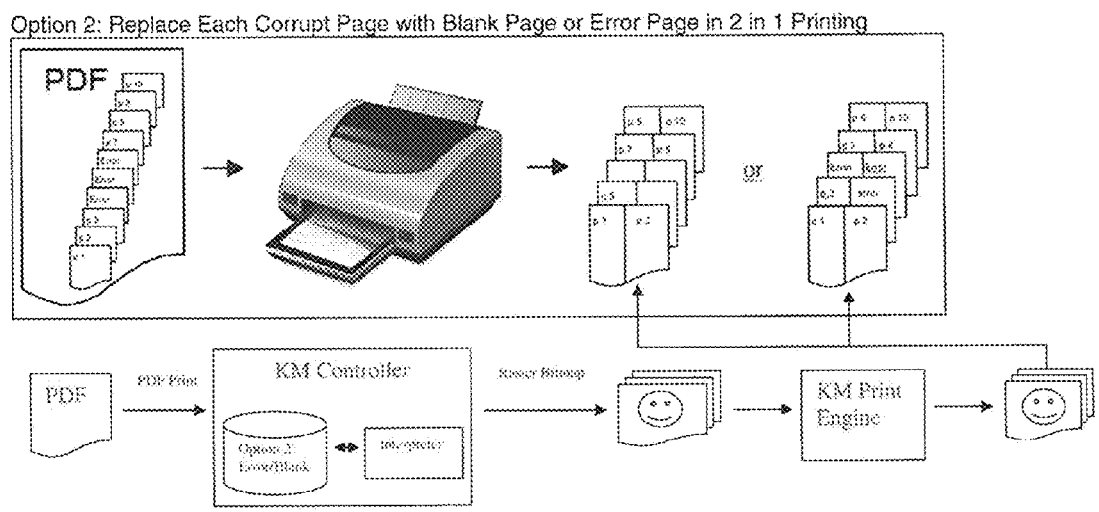
FIG. 5 schematically illustrates another exemplary optional process for printing PDF files that contain corrupted pages according to embodiments of the present invention.

Referring to FIG. 5, there is schematically illustrated another exemplary optional process for printing PDF files that contain corrupted pages according to embodiments of the present invention. As shown in FIG. 5, for this second option (Option 2) where the DIP switch setting is to replace each corrupt page with either an error page or a blank pages, the rendering processes will render non-corrupt pages normally, but generate either an error page or a blank page for a corrupted page, and continue to render the next page until the end of the PDF file. This option is particularly useful for 2-in-1 or duplex printing because it keeps the pages and printed sheets in order. In the example of a 2-in-1 or duplex printing shown in FIG. 5, the PDF file contains 10 pages, where pages 4-6 are corrupted. This optional process will print normal page 1 and a blank or error page 2 on the first sheet, print blank or error pages 3 and 4 on the second sheet, and print normal pages 5-10 on the third, fourth and fifth sheets respectively.

Figure 6:
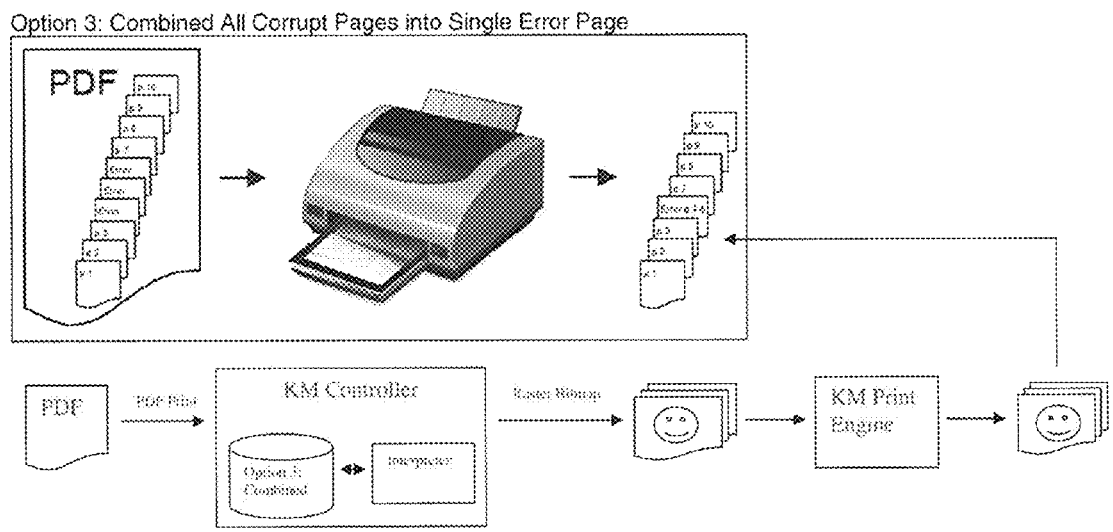
FIG. 6 schematically illustrates still another exemplary optional process for printing PDF files that contain corrupted pages according to embodiments of the present invention.

Referring to FIG. 6, there is schematically illustrated still another exemplary optional process for printing PDF files that contain corrupted pages according to embodiments of the present invention. As shown in FIG. 6, for this third option (Option 3) where a DIP switch setting is to combine all corrupt pages into one single error page, the rendering processes will render all non-corrupt pages normally, but generate one single error page for all the corrupted pages. The main benefit of this option is the saving of paper and printer resources as no extra error or blank pages are printed. The combined error page will contain valuable information such as which pages are corrupted, and detailed information of the error occurred at each corrupted page, etc. In the example shown in FIG. 6, the PDF file contains 10 pages, where pages 4-6 are corrupted. This optional process will print non-corrupt pages 1-3 and 7-10, but combine the corrupted pages 4-6 into printing-out only one single error page.

Figure 7:
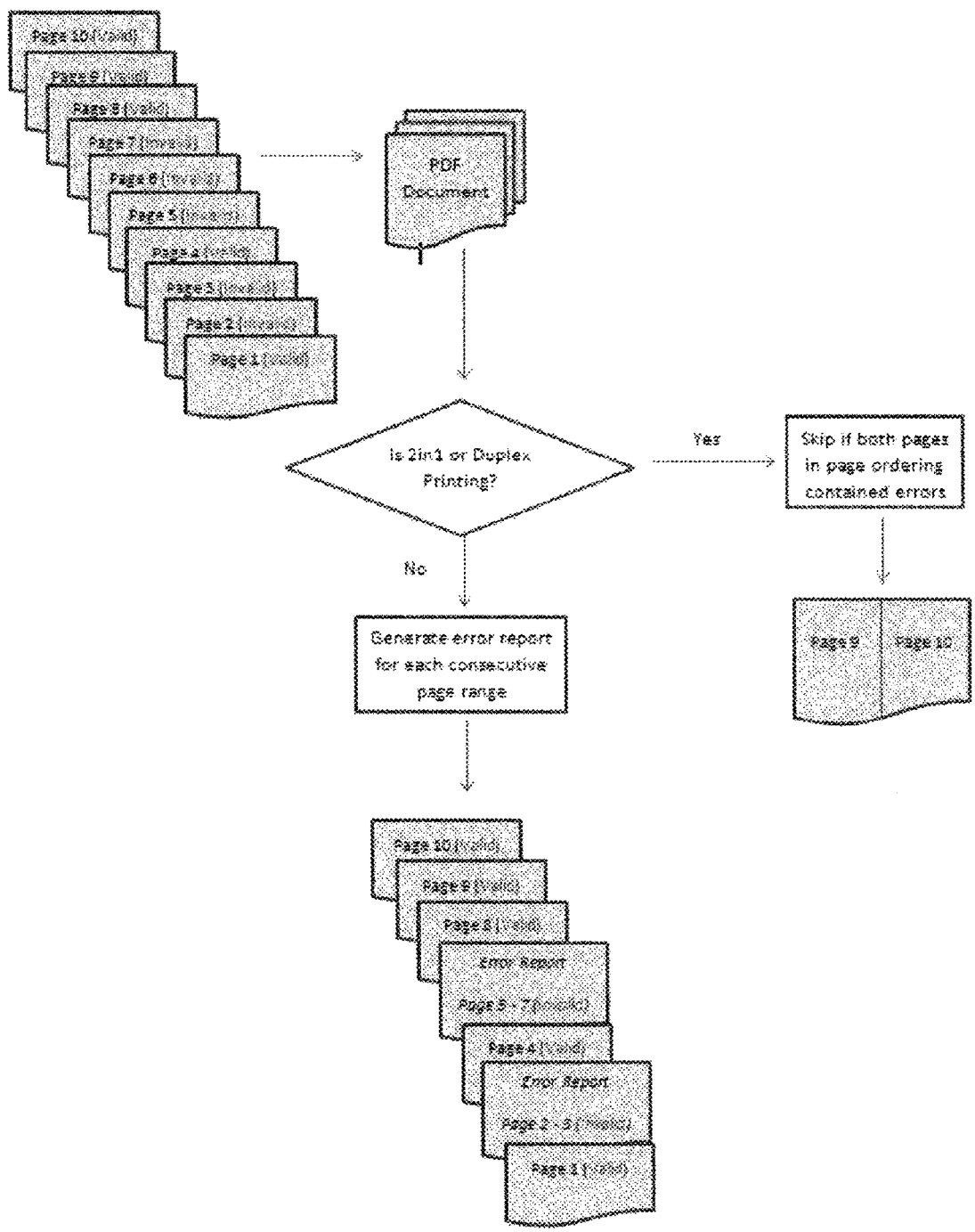
FIG. 7 schematically illustrates a flowchart of an exemplary process that implements the method for printing PDF files that contain corrupted pages according to embodiments of the present invention.

Referring to FIG. 7, there is schematically illustrated a flowchart of an exemplary process that implements the method for printing PDF files that contain corrupted pages according to embodiments of the present invention. In this exemplary embodiment, an error report page is generated for each range of consecutive error pages. As shown in FIG. 7, when a PDF file is processed by the print interpreter, it is first determined whether it is for a simplex printing or a duplex (or 2-in-1) printing.

For simplex printing, a specific DIP SW setting will be turned on to inform the interpreter to update its default settings to record which pages are skipped due to page corruption. With this record, the interpreter will render the non-corrupt pages normally, but generate an error report for each consecutive page range of corrupted pages (e.g., a first page range of corrupted pages 2-3, and a second page rage of corrupted pages 5-7, as in the example shown in FIG. 7 where the PDF contains 10 pages wherein pages 1, 4 and 8-10 are non-corrupted pages). The interpreter will continue to render the next page until the end of the PDF file. As a result, the printer will output normal pages, along with an error report in place of each page range of the corrupted pages.

Figure 8:
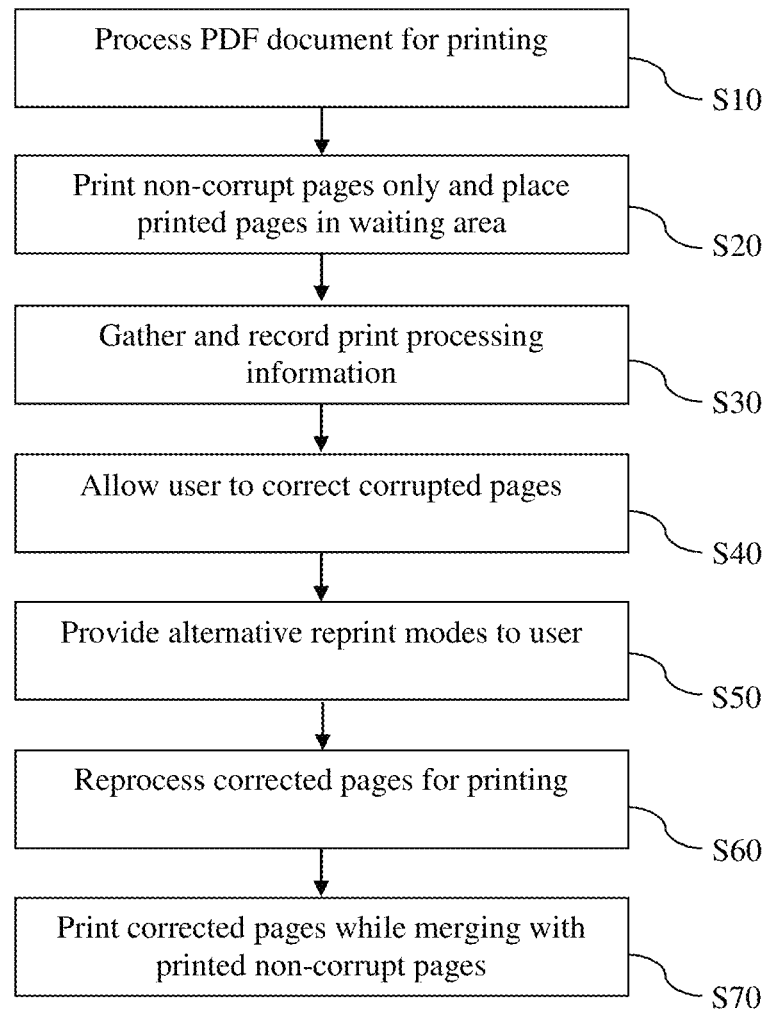
FIG. 8 schematically illustrates a flowchart of another exemplary process that implements the method for printing PDF files that contain corrupted pages according to embodiments of the present invention.

For duplex or 2-in-1 printing, another specific DIP SW setting will be turned on to inform the interpreter to update its default settings to record which pages are skipped due to page corruption. Based on the record of the skipped pages, another default setting will determine if two consecutive pages (that are originally to be printed on a same sheet) should indeed be printed. If none of these two pages is corrupt, then they will be printed normally. However, if one of these two pages is corrupt, then either they both are not printed, or the sheet will be printed with the normal page plus an error or blank page for the corrupted page. Of course if both pages are corrupt, then either the sheet is not printed, or an error or blank sheet will be printed to keep the page/sheet order for the duplex or 2-in-1 printing. Referring to FIG. 8, there is schematically illustrated a flowchart of another exemplary process that implements the method for printing PDF files that contain corrupted pages according to embodiments of the present invention. As shown in FIG. 8, the basic steps of the exemplary process according to embodiments of the present invention are as follows.

At step S10, a PDF file is sent to the printer 12 for printing either directly or indirectly via the server 14. The processor unit 50 of the printer 14 processes the PDF file by executing printer software programs that include interpreting/raster image processing (RIP) programs which cause the image processing unit 56 of the printer 14 to render the data from the PDF file for printing by the print engine of the printer 14.

At step S20, as the printer 14 rasterizing the images of the pages of the PDF file, the non-corrupt pages (hereinafter sometimes referred to as "OK pages") in the PDF file are printed and placed in a waiting area such as a manual feed tray or a post-inserter attached to the printer 14. However, as the printer 14 encounters corrupted pages (hereinafter sometimes referred to as "NG pages") in the PDF file, the printer will not print them.

At step S30, the processor unit 50 of the printer 14 will gather information of both the OK pages and the NG pages, as well as other information of the PDF file and print processing information, and save such information in the storage unit 54 of the printer 14 for later retrieval. For example, assuming the PDF file is a 10-page document, and pages 1, 4 and 8-10 are OK pages but pages 2-3 and 5-7 are NG pages. The controller 50 may gather and save the following information into the storage 54:

(1) file name of the PDF file;

(2) user name (the user who sent the PDF file for printing;

(3) page number of the correctly printed OK pages (e.g. page nos. 1, 4, 8, 9, 10), image size, paper size, paper type, and attributes (e.g., Nup, duplex, booklet, etc.); and (4) page number of the skipped (not printed) NG pages (e.g. page nos. 2, 3, 5, 6, 7), image size, paper size, paper type, and attributes (Nup, duplex, booklet, etc.).

At step S40, the NG pages are sent back to the user to allow the user an opportunity to correct the errors on the NG pages. This may be done in a number of ways. For example, if the user is at the printer, the control panel 40 of the printer 14 may provide an UI to the user which allows the user to correct the errors on the NG pages. Alternatively, if the PDF file was sent to the printer by a user at the server 12, then the NG pages may be sent back to a print management application executed at the server 12 which will provide an UI to the user for correcting the errors on the NG pages.

At step S50, after the user has corrected the errors on the NG pages, various reprint modes are provided to the user. For example, the reprint modes may include a normal print mode where all pages (OK pages and corrected NG pages) are re-printed, a partial print mode where only the NG pages are printed, and a merger mode where the NG pages are reprinted while merging with the already-printed OK pages.

At step S60, the printer 14 will reprocess (rasterizing) the corrected NG pages and reprint the PDF file based on the reprint mode selected by the user.

At step S70, in the merge print mode, the printer 14 will print the corrected NG pages while merging with the already printed OK pages. As the corrected NG pages are printed, they are merged at an output tray of the printer 14 with the already printed OK pages which are fed from the waiting area (such as a manual input tray or a post inserter).

Figure 9:
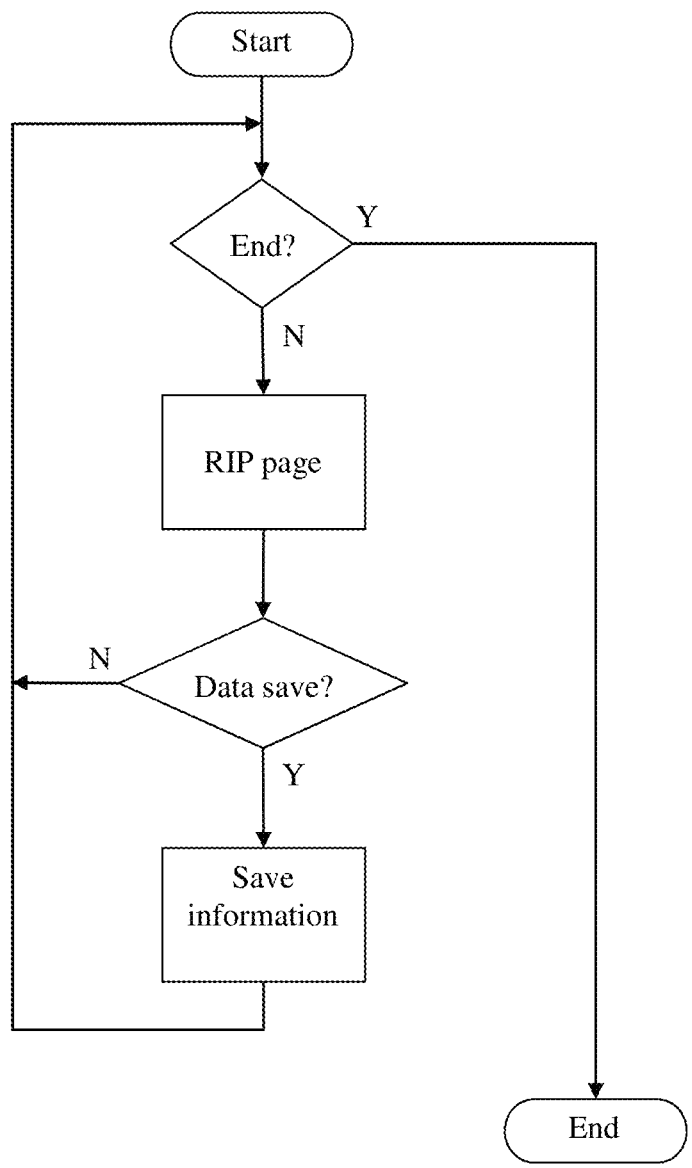
FIG. 9 schematically illustrates a flowchart of an exemplary page information gathering and saving process of the method for printing PDF files that contain corrupted pages according to embodiments of the present invention.

Referring to FIG. 9, there is shown schematically illustrates a flowchart of an exemplary page information gathering and saving process of the method for printing PDF files that contain corrupted pages according to embodiments of the present invention. As shown in FIG. 9, when the printing process starts, the printer 14 will begin with the rasterizing the images of the pages of the PDF file (i.e., step S20 shown in FIG. 8). As the images of the pages of the PDF file is rasterized, the printer controller 50 will gather and save information of both the OK pages that can be correctly rasterized and printed, and the NG pages encountered (i.e., step S30 shown in FIG. 8). Other information of the PDF file, such as the file name, user name, etc., may also be gathered and saved. This process will continue until all pages in the PDF file are processed.

Using the example mentioned earlier (i.e., the PDF file is a 10-page document, and pages 1, 4 and 8-10 are OK pages but pages 2-3 and 5-7 are NG pages), the PDF file information and page processing information may be saved in a table as shown below:

| PDF File and Page Information Table | | | | | |
|---|---|---|---|---|---|
| Job Information | | | | | |
| File Name | | xxxxxxxx.pdf | | | |
| User Name | | Xxxx Xxxxxx | | | |
| Date/Time | | xx/xx/xx xx:xx | | | |
| Page Information | | | | | |
| Page Number | RIP Result | Image Size | Paper Size | Paper Type | Attribute |
| 1 | OK | xxxx X xxxx | Letter | Plain | 1 up, simplex |
| 2-3 | NG | xxxx X xxxx | Letter | Plain | 1 up, simplex |
| 4 | OK | xxxx X xxxx | Letter | Plain | 1 up, simplex |
| 5-6 | NG | xxxx X xxxx | Letter | Plain | 1 up, simplex |
| 7 | NG | xxxx X xxxx | 11 × 17 | Plain | 1 up, simplex |
| 8-10 | OK | xxxx X xxxx | Letter | Plain | 1 up, simplex |

The information table can be retrieved later in the reprint process as described in more detail below.

Figure 10:
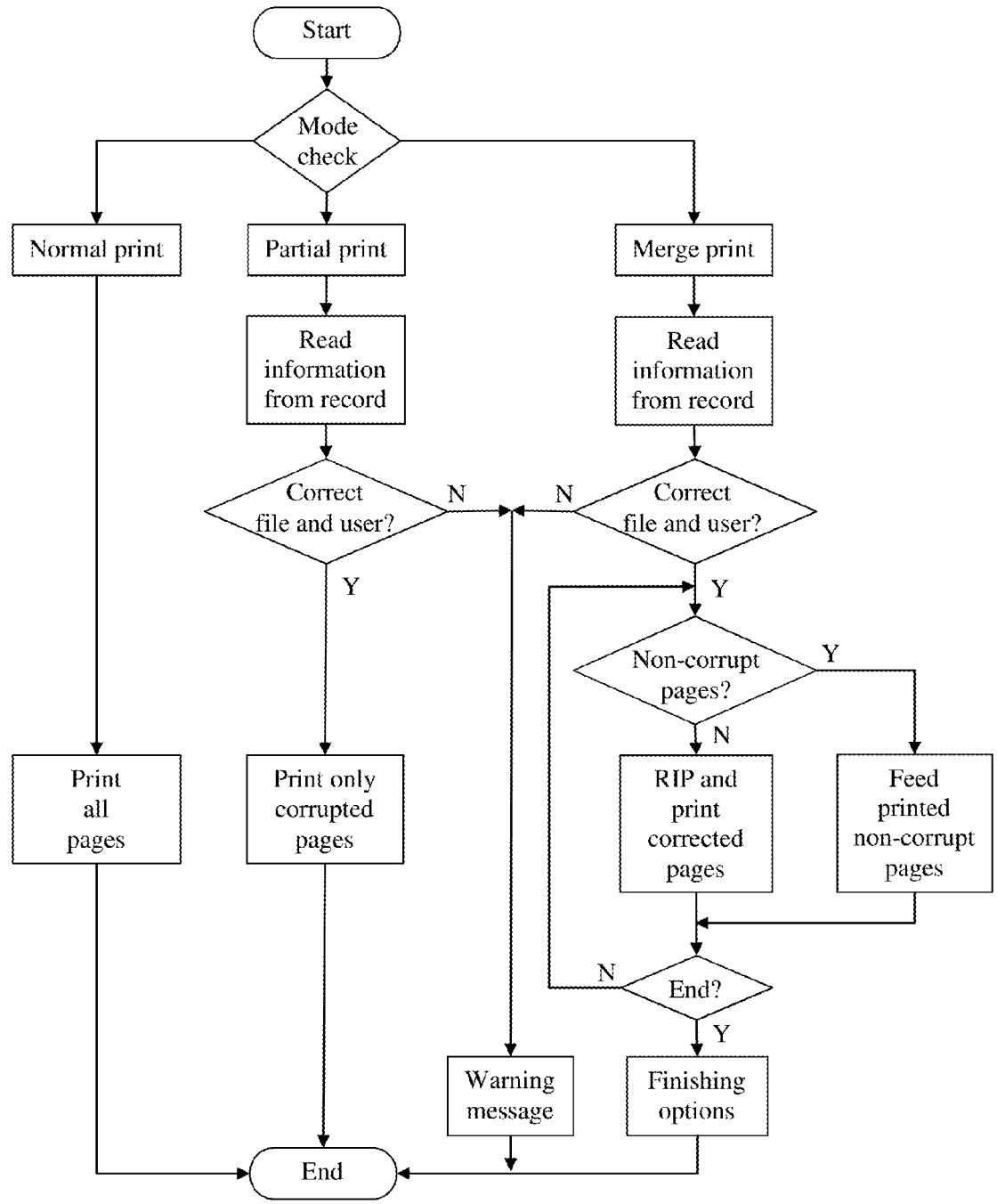
FIG. 10 schematically illustrates a flowchart of an exemplary reprint process that implement the method for printing PDF files that contain corrupted pages according to embodiments of the present invention.

Referring to FIG. 10, there is schematically illustrated a flowchart of an exemplary reprint process that implement the method for printing PDF files that contain corrupted pages according to embodiments of the present invention. The reprint process (i.e., steps S50, S60 and S70) preferably happens after the user has corrected the errors on the NG pages (at step S40). As shown in FIG. 10, at the start of the reprint process, the printer will check the reprint mode selected by the user.

If the mode selected by the user is the normal print mode, all pages including the OK pages and corrected NG pages will be reprinted.

However, if the mode selected by the user is the partial print mode, the controller 50 of the printer 14 will first retrieve the PDF file and page information table stored in the storage unit 54 of the printer 14, and read the information from the table. The file name and user name will be checked to ensure that it is the right PDF file to be reprocessed. If there is a mismatch, an error message will be provided and the reprint process will terminate. After the file name and user name are confirmed, the controller 50 and image processer 56 of the printer 14 will proceed to rasterize only the corrected NG pages of the PDF file, and the print engine 58 of the printer 14 will then print these corrected NG pages.

Moreover, the embodiments of the present invention also provide a merge print mode where the corrected NG pages will be reprinted while merging with the already printed OK pages. Again as shown in FIG. 10, the controller 50 of the printer 14 will first retrieve the PDF file and page information table stored in the storage unit 54 of the printer 14, and read the information from the table. Again, the file name and user name will be checked to ensure that it is the right PDF file to be reprocessed. If there is a mismatch, an error message will be provided and the reprint process will terminate.

Once the file name and user name are confirmed, the controller 50 of the printer 14 will process the resent PDF file with a page check based on the page information retrieved from the table, as each page has already been recorded as either an OK page or an NG page.

If it is a turn to print an OK page, then the OK page will not be reprinted as it has already been printed and is waiting in the waiting area such as a manual input or feed tray or a post-inserter. Instead, this already printed OK page will be fed from the waiting area to the output tray of the printer 14.

However, if it is a turn to print an NG page, then the image processer 56 of the printer 14 will rasterize the corrected NG page, and the print engine 58 of the printer 14 will then print this corrected NG page which will also be output to the output tray of the printer 14 to merge with the already printed OK pages.

The sequence of processing the pages are based on the page number information read from the table, so that the already printed OK pages and reprinted correct NG pages are merged in the right order. After all pages are process, the output tray of the printer 14 will have all the pages of the PDF file printed and correctly ordered. The user may be provided certain finishing options and the printer 14 can proceed with the user selected finishing options before the entire print job is concluded.

Of course the option selected at the initial print (i.e., the first print run) and the merge print mode selected at the reprint (i.e., the second print run) may be combined in a number of alternative ways. Since the printer already knows about which options has been selected at the first print from the selected setting, the printer can merge the OK pages from the first printed and the pages newly printed from the second print, based on the setting information.

Figure 11A:
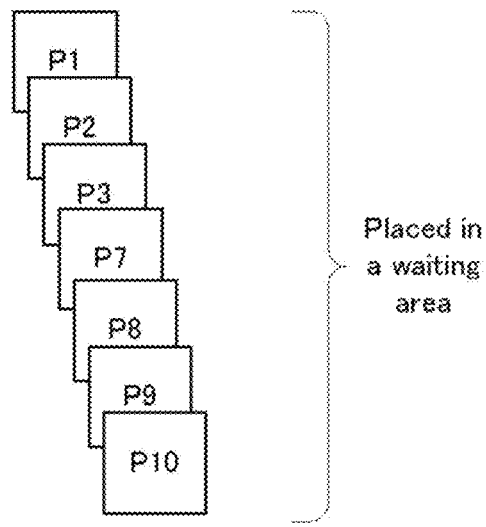
FIGS. 11(a) and 11(b) schematically illustrate an exemplary print out of the pages of a PDF files that contain corrupted pages from one combination of an option selected for the first print and a merge mode selected for the second print according to embodiments of the present invention.
Figure 11B:
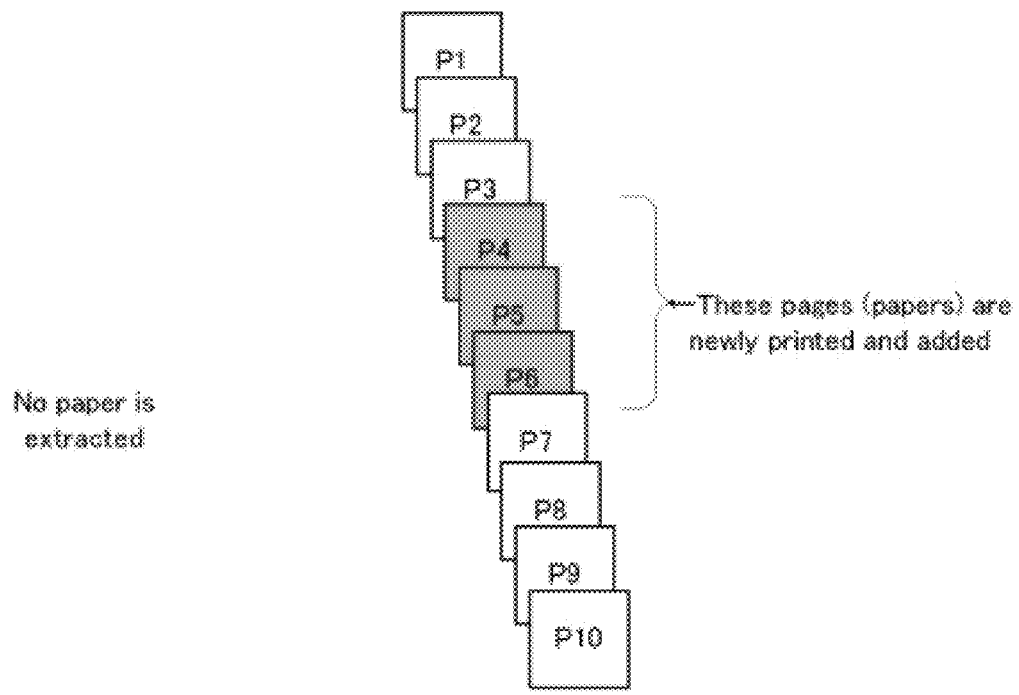

Referring to FIGS. 11(*a*) and 11(*b*), there is schematically illustrated an exemplary print out of the pages of a PDF files that contain corrupted pages from one combination of an option selected for the first print and a merge mode selected for the second print according to embodiments of the present invention. In this example, the option selected is to print OK pages only at the first print, and the merge mode selected is to merge the corrected NG pages printed at the second print with the already printed OK pages. As shown in FIG. 11(*a*), at the first print run, the OK pages 1-3 and 7-10 are printed at the first print and placed in a waiting area. As shown in FIG. 11(*b*), at the second print run, the corrected NG pages 4-6 are reprinted and merged with the already printed OK pages 1-3 and 7-10 in correct page sequence. There is no page extracted.

Figure 12A:
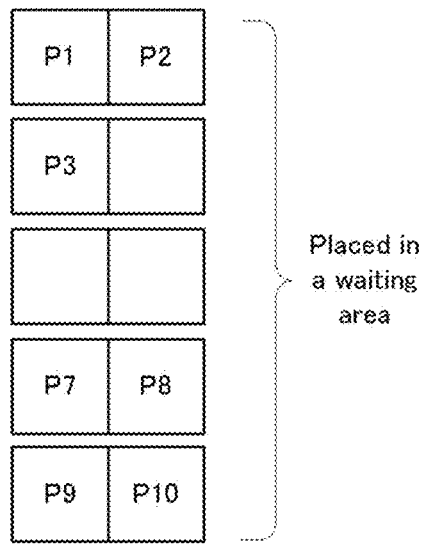
FIGS. 12(a) and 12(b) schematically illustrate another exemplary print out of the pages of a PDF files that contain corrupted pages from another combination of another option selected for the first print and another merge mode selected for the second print according to embodiments of the present invention.
Figure 12B:
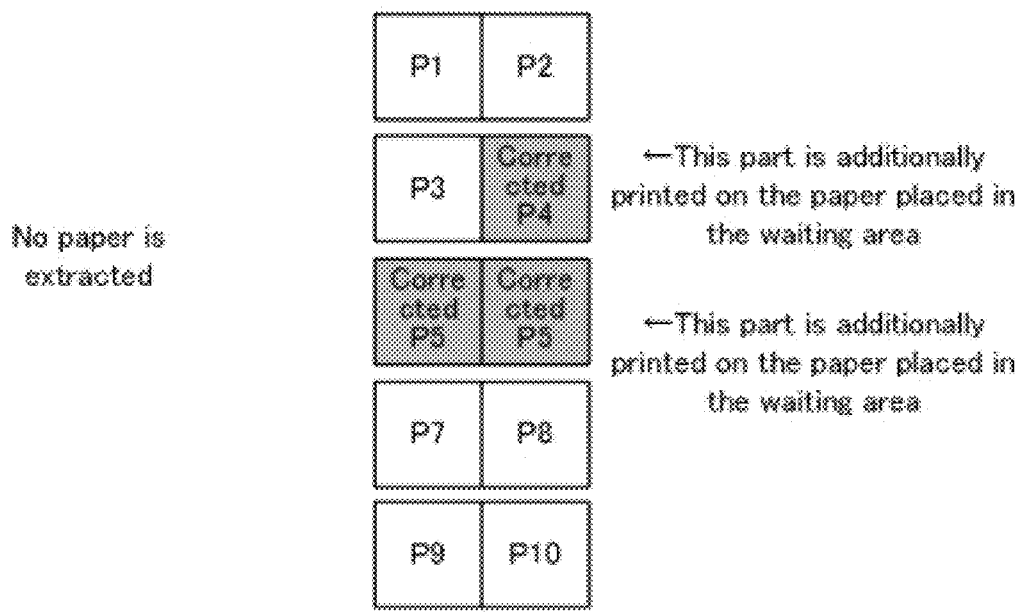

Referring to FIGS. 12(*a*) and 12(*b*), there is schematically illustrated another exemplary print out of the pages of a PDF files that contain corrupted pages from another combination of another option selected for the first print and another merge mode selected for the second print according to embodiments of the present invention. In this example of a 2-in-1 printing, the option selected is to print OK pages and leave the NG pages blank at the first print, and the merge mode selected is to print the corrected NG pages on the blank pages at the second print. As shown in FIG. 12(*a*), at the first print run, the OK pages 1-3 and 7-10 are printed and the NG pages 4-6 are left blank at the first print, and the five (5) 2-in-1 print out sheets are placed in a waiting area. As shown in FIG. 12(*b*), at the second print run, the corrected NG pages 4-6 are reprinted on the blank pages, so that all five (5) printed out sheets now have correct pages 1-10 printed thereon in correct page sequence. There is no sheet extracted.

Figure 13A:
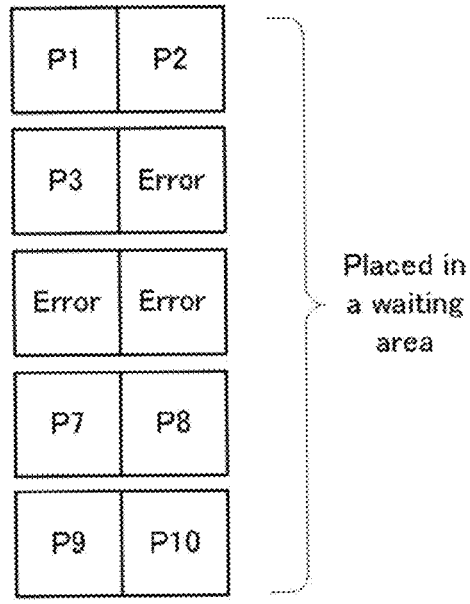
FIGS. 13(a) and 13(b) schematically illustrate still another exemplary print out of the pages of a PDF files that contain corrupted pages from still another combination of still another option selected for the first print and still another merge mode selected for the second print according to embodiments of the present invention.
Figure 13B:
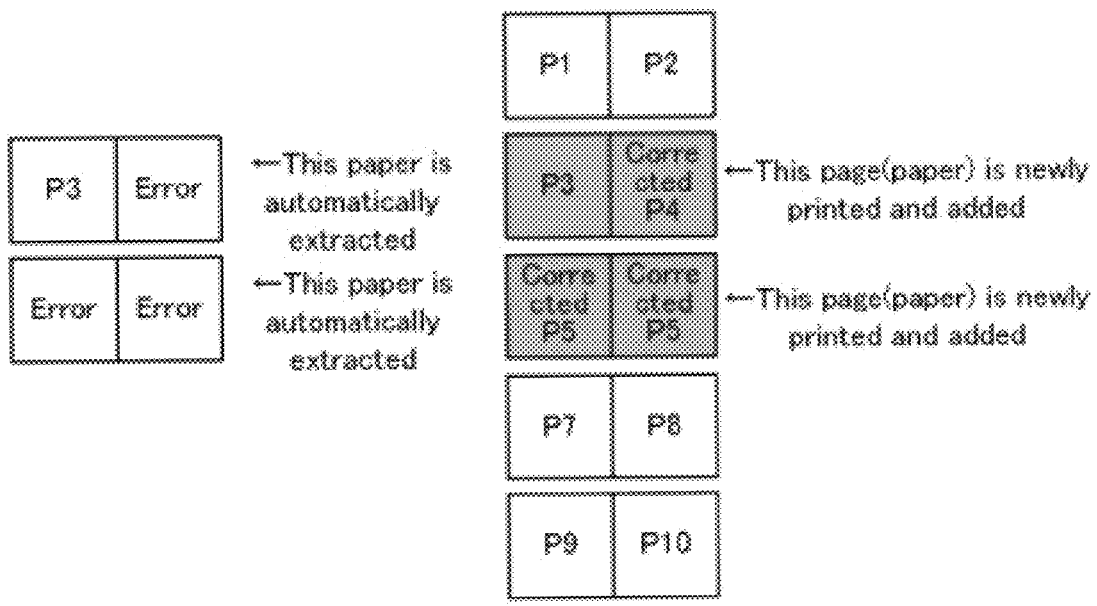

Referring to FIGS. 13(*a*) and 13(*b*), there is shown schematically illustrate still another exemplary print out of the pages of a PDF files that contain corrupted pages from still another combination of still another option selected for the first print and still another merge mode selected for the second print according to embodiments of the present invention. In this additional example of a 2-in-1 printing, the option selected is to print OK pages and print error pages for the NG pages at the first print, and the merge mode selected is to print the corrected NG pages to replace the error pages at the second print. As shown in FIG. 13(*a*), at the first print run, the OK pages 1-3 and 7-10 are printed and the NG pages 4-6 are printed as error pages at the first print, and the five (5) 2-in-1 print out sheets are placed in a waiting area. As shown in FIG. 13(*b*), at the second print run, the sheets that contain error pages are extracted, and the corrected NG pages 4-6 are reprinted. When necessary (as in the case of page 3) where the 2-in-1 sheet contains an OK page and an NG page (as in the case of the sheet containing pages 3-4), the OK page (here page 3) needs to be reprinted as well so that the reprinted OK page (here page 3) and corrected NG page (here page 4) are printed on a same sheet to replace the extracted sheet, so that all five (5) 2-in-1 sheets now have correct pages 1-10 printed thereon in correct page sequence.

Figure 14A:
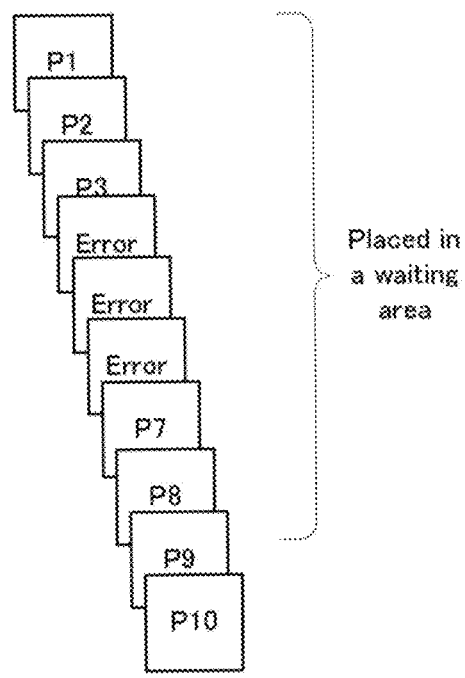
FIGS. 14(a) and 14(b) schematically illustrate still another exemplary print out of the pages of a PDF files that contain corrupted pages from still another combination of still another option selected for the first print and still another merge mode selected for the second print according to embodiments of the present invention.
Figure 14B:
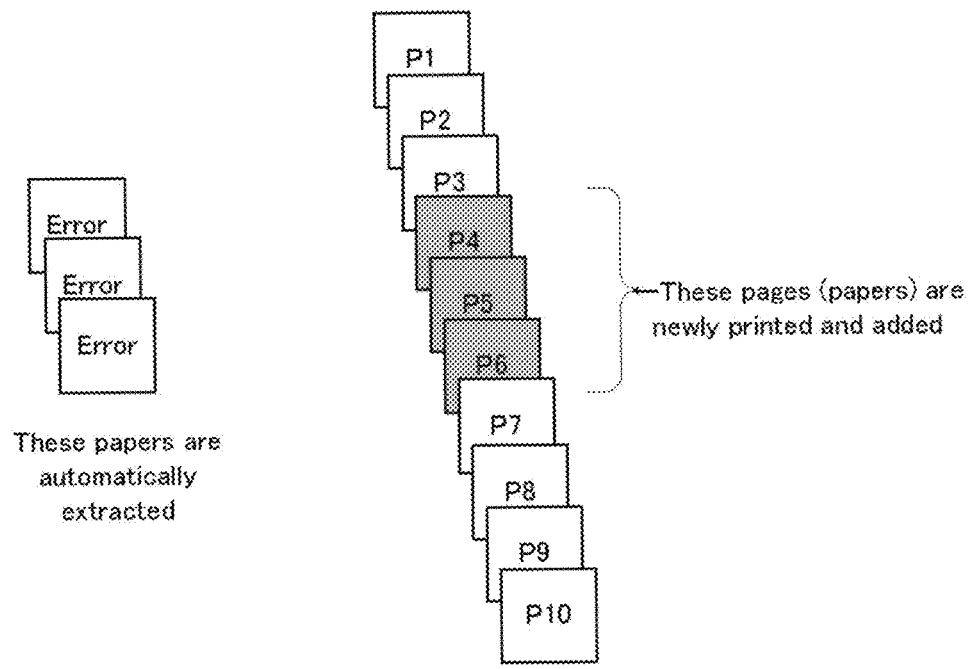

Referring to FIGS. 14(*a*) and 14(*b*), there is schematically illustrated still another exemplary print out of the pages of a PDF files that contain corrupted pages from still another combination of still another option selected for the first print and still another merge mode selected for the second print according to embodiments of the present invention. In this example of a simplex printing, the option selected is to print OK pages and print error pages for the NG pages at the first print, and the merge mode selected is to print the corrected NG pages to replace the error pages at the second print. As shown in FIG. 14(*a*), at the first print run, the OK pages 1-3 and 7-10 are printed and the NG pages 4-6 are printed as error pages at the first print, and the ten (10) print out pages are placed in a waiting area. As shown in FIG. 14(*b*), at the second print run, the error pages 4-6 are extracted, and the corrected NG pages 4-6 are reprinted and merged with the already printed OK pages 1-3 and 7-10 in correct page sequence.

Figure 15A:
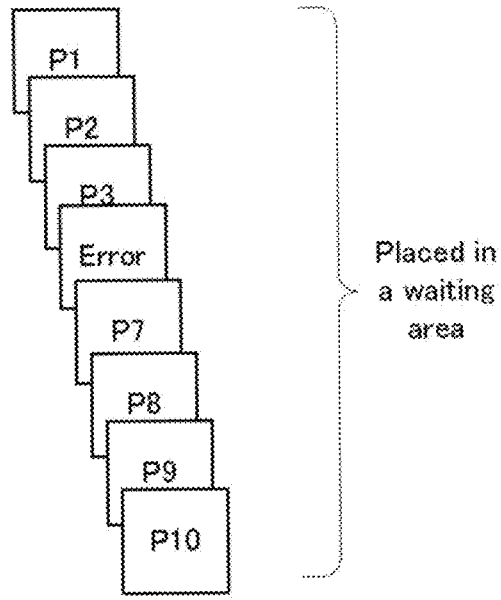
FIGS. 15(a) and 15(b) schematically illustrate still another exemplary print out of the pages of a PDF files that contain corrupted pages from still another combination of still another option selected for the first print and still another merge mode selected for the second print according to embodiments of the present invention.
Figure 15:
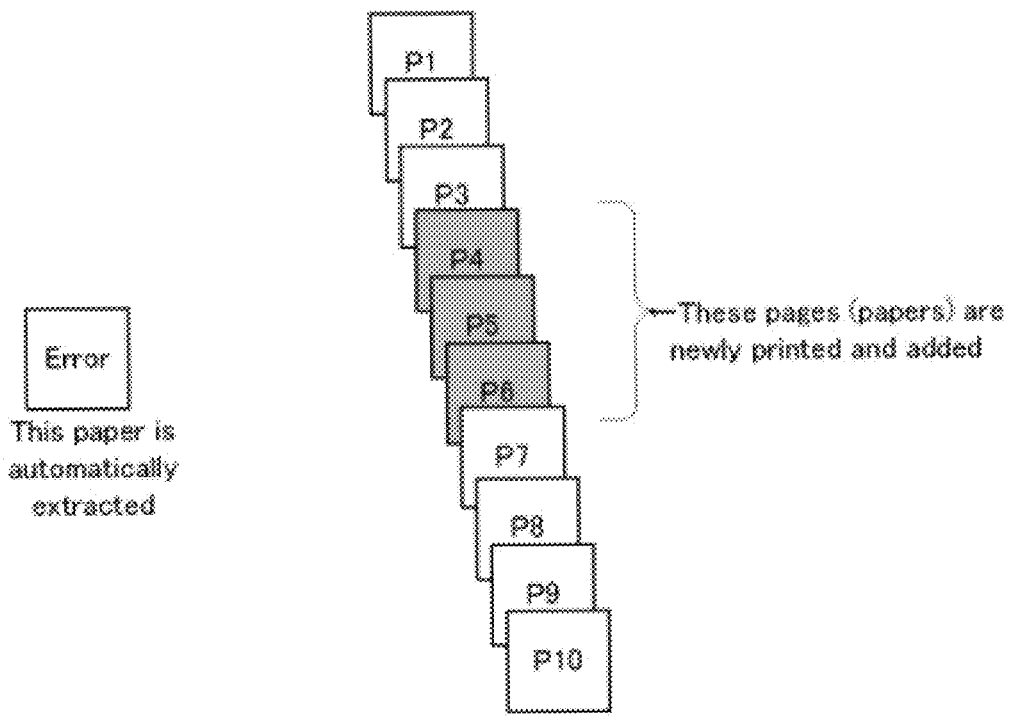

Referring to FIGS. 15(*a*) and 15(*b*), there is schematically illustrated still another exemplary print out of the pages of a PDF files that contain corrupted pages from still another combination of still another option selected for the first print and still another merge mode selected for the second print according to embodiments of the present invention. In this additional example of a simplex printing, the option selected is to print OK pages and print one error page for each consecutive page range of the NG pages at the first print, and the merge mode selected is to print the corrected NG pages to replace the single error page for each consecutive error page range of the NG pages at the second print. As shown in FIG. 15(*a*), at the first print run, the OK pages 1-3 and 7-10 are printed and one error page is printed for the consecutive error page range of the NG pages 4-6 at the first print, and the OK pages 1-3 and 7-10 and the single error page (for NG pages 4-6) are placed in a waiting area. As shown in FIG. 15(*b*), at the second print run, the single error page is extracted, and the corrected NG pages 4-6 are reprinted and merged with the already printed OK pages 1-3 and 7-10 in correct page sequence.

The above described process may be implemented by a computer software program. The present invention also provides a computer program product that includes a computer usable non-transitory medium (e.g. memory or storage device) having a computer readable program code embedded therein for controlling a data processing apparatus, the computer readable program code configured to cause the data processing apparatus to execute the above described process.

The present invention has many advantages. It provides a new method for printing PDF files with corrupted pages which allows a user to print the non-corrupt pages before the whole printing job is terminated, so that the user will have an opportunity to know important information about the PDF file. In addition, by merging already printed OK pages with reprinted corrected NG pages, the waste of papers and other resources is reduced because both the OK pages and NG page are only printed once for one set of printing. The new method also increases the speed of the printing process, as the NG pages are not rasterized and printed in the first run (only OK pages are rasterized and printed), and the OK pages are not rasterized and printed in the re-run (only NG pages are rasterized and reprinted). Furthermore, the new method provides many user friendly features, including the feature allowing the user to correct NG pages, selecting reprint-mode, and automatically merging printed OK pages and reprinted NG pages, etc.

It will be apparent to those skilled in the art that various modification and variations can be made in the method and related apparatus of the present invention without departing from the spirit or scope of the invention. Therefore, it is intended that the present invention covers any and all modifications and variations that come within the scope of the appended claims and their equivalents.

What is claimed is:

1. A method implemented in a data processing apparatus for print portable document format (PDF) files with corrupted pages, comprising the steps of:
    rasterizing images of all non-corrupt pages but not corrupted pages of a PDF file, the corrupted pages of the PDF file being pages of the PDF file that cannot be displayed or printed correctly;
    printing all of and only the non-corrupt pages of the PDF file;
    gathering and recording file and page information including which pages are non-corrupt pages and which pages are corrupted pages in the PDF file based solely on information in the PDF file;
    allowing correction of the corrupted pages of the PDF file for reprint;
    retrieving saved file and page information for reprint of the PDF file;
    based on the file and page information retrieved, rasterizing images of the corrected corrupted pages; and
    printing the corrected corrupted pages while merging with the already-printed non-corrupt pages to produce a complete set of print out of all non-corrupt pages and corrected corrupted pages of the PDF file in a correct sequence according to the file and page information retrieved.

2. The method of claim 1, further comprising the step of placing the printed non-corrupt pages of the PDF file in a waiting area adjacent for later merging with the reprinted corrected corrupted pages of the PDF file.

3. The method of claim 2, wherein the waiting area for placing the printed non-corrupt pages of the PDF file is a manual feeding tray.

4. The method of claim 2, wherein the waiting area for placing the printed non-corrupt pages of the PDF file is a post-inserter.

5. The method of claim 1, further comprising the step of correcting the corrupted pages of the PDF file for reprint.

6. The method of claim 1, further comprising the step of providing multiple modes for reprinting of the PDF file.

7. The method of claim 6, wherein the multiple modes for reprinting of the PDF file comprise a normal print mode wherein all pages of the PDF file are reprinted.

8. The method of claim 6, wherein the multiple modes for reprinting of the PDF file comprise a partial print mode wherein only the corrected corrupted pages of the PDF file are reprinted.

9. The method of claim 6, wherein the multiple modes for reprinting of the PDF file comprise a partial print mode wherein the corrected corrupted pages of the PDF file are reprinted while merging with the already-printed non-corrupt pages of the PDF file.

10. The method of claim 1, further comprising the step of checking whether a file name and a user name of the PDF file match respectively a file name and a user name in the file and page information retrieved, wherein the step of printing the corrected corrupted pages is performed only if they match.

11. A computer program product comprising a non-transitory computer usable medium having a computer readable code embodied therein for controlling a data processing apparatus, the computer readable program code configured to cause the data processing apparatus to execute a process for print portable document format (PDF) files with corrupted pages, the process comprising the steps of:
    rasterizing images of all non-corrupt pages but not corrupted pages of a PDF file, the corrupted pages of the PDF file being pages of the PDF file that cannot be displayed or printed correctly;
    printing all of and only the non-corrupt pages of the PDF file;
    gathering and recording file and page information including which pages are non-corrupt pages and which pages are corrupted pages in the PDF file based solely on information in the PDF file;
    allowing correction of the corrupted pages of the PDF file for reprint;
    retrieving saved file and page information for reprint of the PDF file;
    based on the file and page information retrieved, rasterizing images of the corrected corrupted pages; and
    printing the corrected corrupted pages while merging with the already-printed non-corrupt pages to produce a complete set of print out of all non-corrupt pages and corrected corrupted pages of the PDF file in a correct sequence according to the file and page information retrieved.

12. The computer program product of claim 11, wherein the process further comprises the step of placing the printed non-corrupt pages of the PDF file in a waiting area adjacent for later merging with the reprinted corrected corrupted pages of the PDF file.

13. The computer program product of claim 12, wherein the waiting area for placing the printed non-corrupt pages of the PDF file is a manual feeding tray.

14. The computer program product of claim 12, wherein the waiting area for placing the printed non-corrupt pages of the PDF file is a post-inserter.

15. The computer program product of claim 11, wherein the process further comprises the step of correcting the corrupted pages of the PDF file for reprint.

16. The computer program product of claim 11, wherein the process further comprises the step of providing multiple modes for reprinting of the PDF file.

17. The computer program product of claim 16, wherein the multiple modes for reprinting of the PDF file comprise a normal print mode wherein all pages of the PDF file are reprinted.

18. The computer program product of claim 16, wherein the multiple modes for reprinting of the PDF file comprise a partial print mode wherein only the corrected corrupted pages of the PDF file are reprinted.

19. The computer program product of claim 16, wherein the multiple modes for reprinting of the PDF file comprise a partial print mode wherein the corrected corrupted pages of the PDF file are reprinted while merging with the already-printed non-corrupt pages of the PDF file.

20. The computer program product of claim 11, wherein the process further comprises the step of checking whether a file name and a user name of the PDF file match respectively a file name and a user name in the file and page information retrieved, wherein the step of printing the corrected corrupted pages is performed only if they match.

* * * * *